Aug. 29, 1967  A. E. BAAK  3,339,043

THERMOSTAT WITH HEAT ANTICIPATOR

Filed Aug. 23, 1965

ALBERT E. BAAK,
INVENTOR

BY HIS ATTORNEYS

HARRIS, KIECH, RUSSELL & KERN.

United States Patent Office 3,339,043
Patented Aug. 29, 1967

3,339,043
THERMOSTAT WITH HEAT ANTICIPATOR
Albert E. Baak, 640 Ocampo Drive,
Pacific Palisades, Calif. 90272
Filed Aug. 23, 1965, Ser. No. 481,715
1 Claim. (Cl. 200—122)

ABSTRACT OF THE DISCLOSURE

A thermostat control unit for a gas furnace or the like incorporating an anticipator heater adjacent the temperature responsive element and an adjustable bypass resistor remote from the heater to provide precise temperature control in a room for furnace controls with various current requirements, with very small temperature differential and little or no overshoot.

---

This invention relates to thermostat control units suitable for use with heating systems such as gas furnaces and the like. A typical thermostat control unit incorporates a temperature responsive element such as a bimetal strip or coil which changes shape or position as a function of the ambient temperature. The temperature responsive element is used to operate an electrical switch which in turn controls the heat source as by energizing a solenoid valve in the gas supply line.

It is desirable in the operation of thermostat controlled heat sources to maintain the temperature differential in the area being heated as small as possible and the operation of such systems has been improved by the utilization of heat anticipator devices. In a control unit incorporating a heat anticipator, an auxiliary heat source, typically an electrical resistance heater, is positioned in the control unit for raising the temperature of the temperature responsive element above that of the area being heated. With this system, the control switch is opened and the heat source is shut off before the ambient temperature of the area arrives at the value at which the temperature responsive element responds. However, because of the time lag in heat transmission from the source to the area being heated, the temperature of the area will continue to increase for a period of time before it levels off and falls. With heat anticipation, the high temperature overshoot can be eliminated and the temperature swing can be substantially reduced.

It is an object of the present invention to provide a thermostat control unit with a new and improved anticipator system which is operable to provide very small temperature differentials. A further object is to provide such a control unit which is operable with a variety of heat source controls without affecting the operating cycle of the control unit. A specific object of the invention is to provide a thermostat control unit which will provide constant heat anticipator values regardless of the current requirements of the heat source control.

It is an object of the invention to provide a thermostat control unit incorporating anticipation and one in which the same amount of current always passes through the same anticipator system regardless of the current requirements of the gas solenoid or other control device. A further object is to provide such a system incorporating a bypass resistor located in a well-ventilated area remote from the temperature responsive element so that the heat energy in the bypass system has no effect on the thermostat cycling range.

It is an object of the invention to provide a thermostat control unit for operation in conjunction with an electric power source and an electric solenoid for controlling the heat source, including a temperature responsive element, an electric switch movable between open and closed positions by the temperature responsive element, an anticipator heating resistor connected in series with the switch and disposed adjacent the temperature responsive element, and circuit means for connecting the resistor and switch in series with a power source and solenoid. A further object is to provide such a control unit incorporating a bypass resistor connected in parallel with the heating resistor and disposed remote from the temperature responsive element. A particular object is to provide such a unit incorporating a metallic electrical conducting temperature responsive element with the anticipator heating resistor connected in series therewith and mounted directly thereover.

It is an object of the invention to provide a thermostat control unit including a housing with a thermal barrier plate defining first and second chambers, each having an air flow path therethrough for ventilation, with the temperature responsive element and anticipator heating resistor mounted in one chamber and with the bypass resistor mounted in the other chamber.

The invention also comprises novel details of construction and novel combinations and arrangements of parts, which will more fully appear in the course of the following description. The drawing merely shows and the description merely describes a preferred embodiment of the present invention which is given by way of illustration or example.

Figure 1:
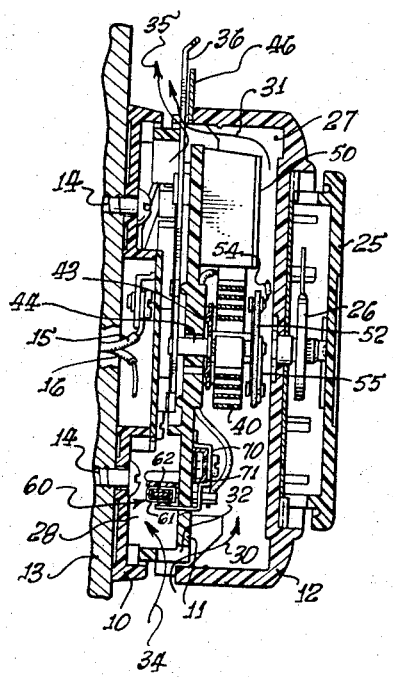
FIG. 1 is a vertical sectional view of a preferred form of the thermostat control unit of the invention.

The thermostat control unit illustrated in the drawing includes a mounting plate 10, the working mechanism itself mounted on a base 11, and a cover 12. The cover 12 is shown in place in FIG. 1 and is removed in FIG. 2. The mounting plate 10 may be affixed to a suitable support such as a wall 13 by screws 14. Electrical conductors 15, 16 are connected to terminals 17, 18, respectively, and provide for coupling the thermostat to an electric power source such as a transformer 20, and a heat source control, such as a gas valve solenoid 21. The base 11 is supported on the mounting plate 10 by lugs 22, 23 which are fastened to the terminals 17, 18, respectively, by screws. The cover 12 is a push fit over the base 11 and may carry a transparent face member 25 with a temperature indicating thermometer 26 thereunder. The cover 12 serves as a shroud or protective enclosure for the working mechanism of the thermostat and in conjunction with the base 11 defines a first chamber 27. The base 11 is spaced outward from the mounting plate 10, defining another chamber 28 therebetween. The mounting plate 10, the base 11 and the cover 12 should be relatively good thermal insulators and preferably are molded plastic parts.

Gaps between the housing 12 and the base 11 provide a vertical air passage through the chamber 27 as indicated by the arrows 30, 31. A plurality of slots 32 in the lower portion of the base 11 and a long slot 33 in the upper portion provide another vertical flow path through the chamber 28 as indicated by the arrows 34, 35. The flow paths are not as devious as it would appear from the view in FIG. 1 since the paths are three-dimensional in nature and the temperature setting lever 36 occupies only a small portion of the slot 33.

A temperature responsive element in the form of a bimetal spiral 40 carries a moving arm 41 of a switch at its outer end. The fixed contact 42 of the switch is mounted directly on the terminal lug 23. The inner end of the bimetal spiral 40 is mounted on a sector gear 43 which in turn is frictionally mounted on a shaft 44 carried in the base 11. The temperature adjustment lever 36 is carried on the shaft 44 and may be manually moved to rotate the inner end of the bimetal spiral and set the temperatures at which the switch contacts will open and close. An indicator plate 46 is carried on the base 11 adjacent the outer end of the lever 36 and is visible when the cover 12 is in position. The device may be initially calibrated by rotating the sector gear 43 and the inner end of the bimetal spiral relative to the lever 36. This may be accomplished by positioning the shaft of a pinion gear in an opening 47 in the base, with the teeth of the pinion gear engaging the teeth of the sector gear. The pinion gear is then rotated while the lever 36 is held fixed to vary the relative angular position of the sector gear and lever.

The switch contacts 41, 42 may be enclosed in a separate housing with a transparent cover 50 for protection against dirt and dust.

Figure 4:
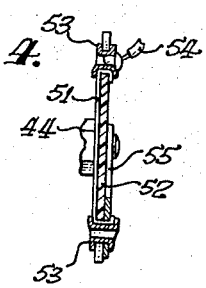
FIG. 4 is an enlarged sectional view taken along the line 4—4 of FIG. 2.

An anticipator heating element typically a length of resistance wire, is positioned adjacent the bimetal 40, preferably directly overlying the spiral. In the embodiment illustrated herein, the anticipator heating resistor is a length of resistance wire 51 (FIG. 4) mounted on an insulator board 52 by eyelets 53. A wire 54 connects one end of the resistor 51 to the terminal lug 22. A conducting plate 55 connects the other end of the resistor 51 to the shaft 44 and through the bimetal 40 to the switch arm 41.

Figure 3:
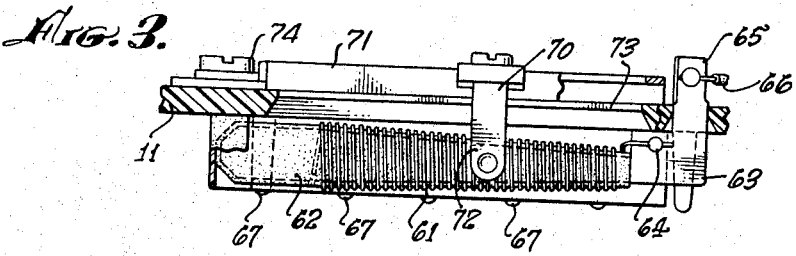
FIG. 3 is an enlarged sectional view taken along the line 3—3 of FIG. 2.

An adjustable bypass resistor 60 is mounted on the base 11 and projects into the chamber 28. The resistor structure is shown in greater detail in FIG. 3 and comprises a length of resistance wire 61 wound on a piece of insulating material 62 disposed over a metal support strip 63. One end of the resistance wire is soldered to the metal strip at 64. A tab 65 of the metal strip projects through the base 11 and is twisted to fix the strip in place. A wire 66 connects the tab 55 with the moving arm 41 of the switch. The resistor structure rests against a plurality of bosses 67, with the left end of the structure squeezed between two such bosses (one not shown).

Figure 2:
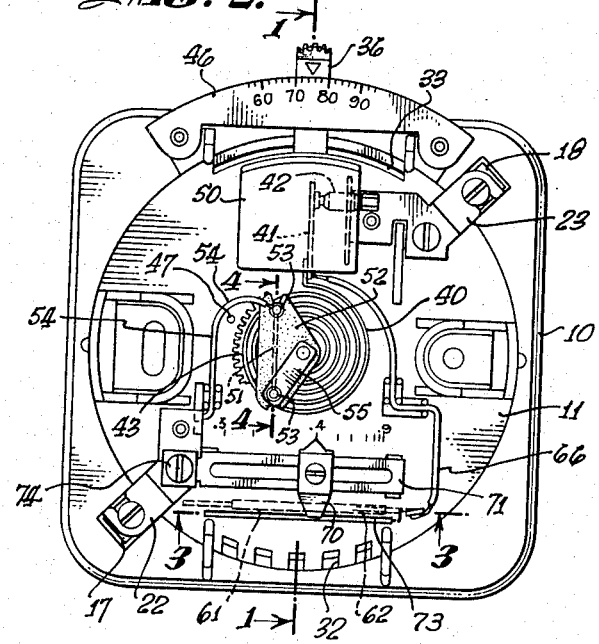
FIG. 2 is a face view of the instrument of FIG. 1 with the cover removed.

A metallic slider member 70 is carried on a grooved support 71 (FIG. 2) on the front face of the base 11 with a contact arm 72 projecting through a slot 73 in the base 11 for engaging the wire 61 of the bypass resistor. The support unit 71 is also an electrical conductor and is fixed to the terminal lug 22 by a screw 74. The slider 70 is moved along the resistance wire to vary the resistance value of the bypass resistor. A pointer may be provided on the slider for use with a scale appearing on the face of the base (FIG. 2).

Figure 5:
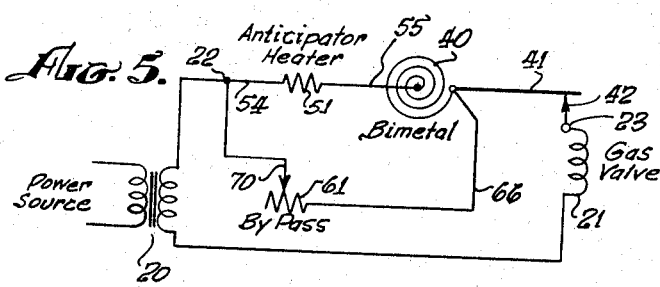
FIG. 5 is an electrical schematic of the thermostat connected in circuit with a power source and a gas valve solenoid.

A schematic diagram of the electrical circuit of the thermostat control unit is shown in FIG. 5. In the preferred form illustrated, the thermal responsive bimetal 40 is an electrical conductor but this is not necessary for the operation of the device. The anticipator heating resistor 51 is connected in series with the switch 41, 42 and also ordinarily in series with the bimetal 40. The bypass resistor 61 is connected in parallel with the heating resistor and the bimetal. The entire control unit is connected in series with the solenoid 21 of a gas valve or other device being controlled and with the power source 20.

In considering the operation of the unit, assume that the switch 41, 42 is open. As the temperature of the room being heated falls, the bimetal 40 cools and moves the switch arm 41 into engagement with the contact 42 to close the electrical circuit through the solenoid. The main burner valve will be opened passing gas to the burner providing an increase in heat in the room. Of course, the solenoid 21 may be a relay which provides a number of control functions including controlling a gas valve and a blower. A portion of the current through the solenoid 21 will be dissipated in the bypass resistor 61 and the other portion of the current will be dissipated in the anticipator heating resistor 51 and in the bimetal itself, if it is in the circuit. The room now heats up and the area immediately adjacent the anticipator heating resistor will heat to a higher temperature, ultimately causing the bimetal 40 to open the switch 41, 42. The heat source is turned off but the temperature in the room will continue to rise for a period of time after which it will drop. When the temperatuer drops below a particular value, the switch 41, 42 will again be closed and the cycle will be repeated.

A good control unit will provide a relatively small temperature differential between the switch closed and switch opened conditions. Typically the unit of the present invention will have a temperature differential of one and one-half degrees Fahrenheit (1½° F.) for operation of the switch. A good control unit will also have a relatively short cycle time, that is, the time for a complete cycle of operation should be relatively short thereby reducing temperature variations in the area being heated. It has been found that the cycle time can be reduced by utilizing an anticipator heating resistor and positioning the resistor adjacent the temperature responsive element so as to have good heat transfer between the two components. The control unit of the present invention typically is operated with a seven-minute cycle time at the 50% load condition. The bimetal element is being heated by the anticipator heater as well as the heat that is generated in the bimetal itself as a function of the current passing through it as an electrical conductor, and this combination of heat applied to the thermal responsive bimetal element causes the thermostat to cycle at a given rate without any change in room temperature whatsoever. In other words, the cycling time is geared to be reasonably fast so that the furnace will pulse the heat into the dwelling and thereby maintain a relatively constant temperature throughout.

A thermostat control unit may be used to operate a variety of different solenoid devices which have various operating currents. It is highly desirable to maintain the temperature differential and the cycle time of the control unit constant regardless of the current requirements of the particular device being controlled. The thermostat control unit of the present invention permits this type of operation. The bimetal and anticipator resistor are selected and adjusted to provide the desired temperature differential and operating cycle with a particular current value which is equal to or less than the operating current of any solenoids with which the thermostat control unit will be used. Then the magnitude of the bypass resistor is adjusted for a particular control solenoid current so that the previously determined anticipator current will pass through the anticipator resistor and the remaining current will pass through the bypass resistor. The bypass resistor is positioned remote from the bimetal and anticipator resistor so that heat from the bypass resistor does not affect the operation of the bimetal. In the structure illustrated, the bypass resistor is positioned on the opposite side of the base 11 which serves as a thermal barrier between the bimetal and the bypass resistor. Separate ventilating paths are provided for the chamber 27 containing the bimetal and the chamber 28 containing the bypass resistor for further isolating the heating effects.

In a typical unit incorporating the structure of the drawing, the bimetal element 40 may have a resistance of 0.2 ohm and the anticipator heating resistor 51 a resistance of 0.25 ohm. With this arrangement, a current of 0.3 ampere will produce a switch temperature differential of 1–12° F. with substantially no temperature variation in the room being heated. The bypass resistor 61 is provided with a maximum resistance of about 3 ohms. When used with a power supply and solenoid control requiring .3 ampere for the solenoid, the bypass resistor 61 is set at the infinite resistance value, with the slider 72 at the left end out of engagement with the resistance wire 61. For a solenoid having a larger current requirement, such as 0.45 ampere, the bypass resistor is set to provide a 0.3 ampere current in the anticipator heating resistor and a 0.15 ampere current in the bypass resistor. This would call for a resistance of about 0.9 ohm for the bypass resistor. Then for a solenoid which requires 0.7 ampere, the setting of the bypass resistor is changed so that the 0.3 ampere is still in the anticipator heating resistor with 0.4 ampere in the bypass resistor. This would call for a resistance value of 0.35 ohm. The scale on the face of the base 11, as seen in FIG. 2, may be calibrated to read directly in control solenoid current permitting a manual setting of the value of the bypass resistor without requiring actual current or resistance measurements by the party making the installation.

Hence it is seen that the thermostat control unit provides an adjustable means for adapting the unit to a variety of systems regardless of the current requirement for the system without affecting the operation of the thermostat control unit itself. The thermostat can be operated at a constant heat anticipator arrangement and can be adjusted for this operation at the time of manufacture. The adjustment for a total current is a simple one and can be made at the time of installation when the particular system being controlled is known. With this thermostat control unit, the same amount of current always passes through the same anticipator system, with the heat resulting from the bypass operation being thermally isolated from the temperature responsive portion of the unit.

Although an exemplary embodiment of the invention has been disclosed and discussed, it will be understood that other applications of the invention are possible and that the embodiment disclosed may be subjected to various changes, modifications and substitutions without necessarily departing from the spirit of the invention in the specification.

I claim as my invention:

In a thermostat control unit for operation in conjunction with an electric power source and an electric solenoid for controlling a heat source, the combination of:
- a housing with a vertical divider plate defining first and second chambers having separate air flow paths therethrough;
- a temperature responsive element mounted in said first chamber;
- an electric switch movable between open and closed positions by said temperature responsive element;
- an anticipator heating resistor connected in series with said switch and mounted in said first chamber adjacent said temperature responsive element with said temperature responsive element exposed to ambient air flow along the path through said first chamber and exposed to the heat of said anticipator heating resistor;
- a bypass resistor connected in parallel with said heating resistor and mounted in said second chamber exposed to ambient air flow along the path through said second chamber and thermally isolated from said anticipator heating resistor, said bypass resistor including means for increasing and decreasing the resistance value thereof to any desired set value between zero and the overall value, with said set value of resistance remaining substantially constant during operation of the thermostat control unit; and
- circuit means for connecting said resistors and switch in series with a power source and solenoid.

References Cited

UNITED STATES PATENTS

| | | | |
|---|---|---|---|
| 2,840,666 | 6/1958 | Greenhut | 200—122 |
| 2,847,536 | 6/1958 | Bishop | 200—122 |
| 2,870,965 | 1/1959 | Kreuter | 200—122 |

BERNARD A. GILHEANY, *Primary Examiner.*

H. A. LEWITTER, *Assistant Examiner.*